(12) United States Patent
Senba et al.

(10) Patent No.: US 7,334,951 B2
(45) Date of Patent: Feb. 26, 2008

(54) CAMERA HEAD

(75) Inventors: Takehiko Senba, Asaka (JP); Kentaro Tokiwa, Asaka (JP); Hiroshi Tanaka, Asaka (JP); Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 317 days.

(21) Appl. No.: 11/229,659

(22) Filed: Sep. 20, 2005

(65) Prior Publication Data

US 2006/0067678 A1    Mar. 30, 2006

(30) Foreign Application Priority Data

Sep. 27, 2004 (JP) ............................. 2004-278707
Apr. 4, 2005 (JP) ............................. 2005-107513

(51) Int. Cl.
*G03B 17/00* (2006.01)
*G02B 7/02* (2006.01)

(52) U.S. Cl. ...................... 396/529; 359/820
(58) Field of Classification Search ............... 361/687, 361/379, 388, 704, 711, 696, 697, 681; 396/74, 396/529; 359/820

See application file for complete search history.

(56) References Cited

U.S. PATENT DOCUMENTS

2006/0285226 A1* 12/2006 Senba et al. ................. 359/694

FOREIGN PATENT DOCUMENTS

| JP | 9-172564 A | 6/1997 |
|---|---|---|
| JP | 10-285441 A | 10/1998 |
| JP | 2003-197894 A | 7/2003 |
| JP | 2003-304420 A | 10/2003 |

* cited by examiner

*Primary Examiner*—Rodney Fuller
(74) *Attorney, Agent, or Firm*—Sughrue Mion, PLLC

(57) ABSTRACT

The present invention is to provide a camera head capable of efficiently radiating heat generated by heat sources in the camera head even if it is equipped with a dust-proofing and drip-proofing structure. A heat radiating member having a higher heat conductivity than the heat conductivity of the lens barrel is disposed farther backward in the direction of the optical axis than the lens barrel. Heat generated in a CPU is transferred to the heat radiating member through a mount section, and heat generated in a CCD is transferred to the heat radiating member through the lens barrel. Since the outer circumference of the heat radiating member is always in contact with the external atmosphere, it is maintained at the temperature level of the external atmosphere, and the heat generated in the CPU and the CCD is efficiently radiated into the outer space.

12 Claims, 10 Drawing Sheets

CAMERA HEAD

BACKGROUND OF THE INVENTION

1. Field of the Invention

The present invention relates to a camera head which is detachably fitted to a camera body for receiving and processing image signals, and is equipped with an image-taking optical system and an imaging element for transmitting image signals to the camera body.

2. Description of the Related Art

In many conventional cameras, only an image-taking optical system is built into the camera head, but more recently an imaging element and even a CPU have come to be disposed in the camera head as imaging elements and CPUs have been significantly reduced in size.

For the earlier arrangement, it is sufficient to make the camera head merely dustproof and drip-proof to protect the image-taking optical system within the camera head, but a camera head in which an imaging element and a CPU are arranged as stated above requires a heat radiating structure in addition to dust-proofing and drip-proofing.

However, a dust-proofing and drip-proofing structure covering the peripheries of electronic components including the imaging element and the CPU would obstruct external radiation of the heat generated by the imaging element and the CPU. If the heat generated by the imaging element and the CPU cannot be efficiently radiated outward, temperatures of the imaging element and the CPU would rise, inviting an increase in noise level, which in turn would result in deteriorated picture quality and erroneous actions.

In an integrated camera or a video camera, usually a CPU and an imaging element are disposed within the camera body, and therefore the heat generated by the CPU and the imaging element can be absorbed by a heat sink or a Peltier element or transferred by a cooling fan or a heat pipe to be radiated externally (see for instance Japanese Patent Application Laid-Open Nos. 2003-304420, 2003-197894, 10-285441 and 9-172564). However, the inner space of the camera head is too small to cover the peripheries of the CPU and the imaging element with a drip-proofing structure and further to arrange such heat radiating members with no strain.

SUMMARY OF THE INVENTION

The present invention has been made in view of the above circumstances and provides a camera head which permits efficient external radiation of heat generated within.

A camera head according to the invention is provided with an image-taking optical system and an imaging element, is detachably fitted to and transmits image signals to a camera body which receives and processes the image signals; the camera head comprises:

- a lens barrel which holds inside both the image-taking optical system and the imaging element and is provided with a rotatable control ring on the outer circumference thereof, and

- the lens barrel is provided with a heat radiating member, which has a higher heat conductivity than the heat conductivity of the lens barrel and radiates heat from heat sources within the lens barrel, in a position farther backward in the direction of the optical axis than the control ring.

In the camera head according to the invention, the presence of the heat radiating member, which has a higher heat conductivity than the heat conductivity of the lens barrel and radiates heat from heat sources within the lens barrel, in a position farther backward in the direction of the optical axis than the control ring contributes to efficient radiation of the heat generated within the lens barrel by transferring it to the heat radiating member.

In this configuration, even if the structure of the lens barrel around the imaging element and the CPU, which are heat sources, is built to be dustproof and drip-proof, the heat generated by those imaging element and CPU can be transferred without fail through the lens barrel of lower heat conductivity to the heat radiating member of higher conductivity to enable the heat generated in the surroundings of the imaging element and the CPU to be efficiently radiated externally.

It is preferable here for at least one of the outer circumference and the inner circumference of the heat radiating member to have fins. The fins may have, for instance, a shape in which multiple protruded stripes and grooves surrounding the outer circumference are alternately arranged around the optical axis, a shape in which multiple protruded stripes and grooves extending on the outer circumference in the direction of the optical axis are alternately arranged around the optical axis, or a shape in which multiple protruded stripes and grooves spirally extending on the outer circumference are alternately arranged around the optical axis.

Where fins are to be formed in a shape in which multiple protruded stripes and grooves extending on the outer circumference in the direction of the optical axis are alternately arranged around the optical axis, it is more preferable for the fins to be arranged in a corrugate shape around the optical axis so that, even if the camera user's fingers touch the outer circumference, the fingers may not be injured by the edges of the protruded stripes.

As described above, the presence of the fins serves to enlarge the area of contact with the external atmosphere and accordingly the efficiency of heat radiation. Where the area of contact is enlarged in this way, the surface temperature of the heat radiating member is maintained at the temperature level of the external atmosphere, namely lower than the temperature of the lens barrel, resulting in a further enhanced heat radiating effect.

Here, the fins are enabled to radiate heat efficiently by forming the protruded stripes and the grooves exactly or approximately in dimensions figured out by the following:

$$B = (L/\Delta T)^{0.25}$$

where $\Delta T$ is the permissible limit of temperature rise, B (mm), the spacing between any one of the protruded stripes and the adjoining one, namely the width of each groove and L (mm), the height from the groove surface to the peak of the protruded stripe.

It is also preferable for the lens barrel to have an eave section which protrudes over the outer circumference of the heat radiating member to prevent user's fingers from coming into contact with the heat radiating member.

In this way, the camera user can be prevented from inadvertently touching the heat radiating member.

It is also preferable for the eave section to have a ventilation port.

Since the presence of the eave section may result in shrinking the area of contact of the heat radiating member with the external atmosphere and thereby reduce the heat radiating effect, it is preferable for the ventilation port to be disposed in the eave section as stated above.

It is also preferable here for the heat radiating member to have a heat receiving section which extends to the vicinity of the heat sources.

Where the heat generated in the heat sources is received by the heat receiving section of the heat radiating member, the heat is transferred to the part of that heat radiating member in contact with the external atmosphere, resulting in more efficient heat radiation.

It is also preferable for communication to be established between the heat receiving section and the heat sources by a heat transfer member.

In this way, the heat generated in the heat sources is transferred to the heat receiving section of the heat radiating member, and is further transferred to the part of that heat radiating member in contact with the external atmosphere, resulting in more efficient heat radiation.

Further, the camera head includes an airtight structure in which the flow of any gaseous matter between a region including the space between the heat receiving section and the heat sources and the outside is prevented instead of disposing a heat receiving section between the heat receiving section and the heat sources, filling the region with a heat transfer gas could provide a similar effect.

It is also conceivable for the lens barrel to have a vertically penetrating ventilation port farther backward in the direction of the optical axis than the control member, and for the heat radiating member to radiate the heat from the heat sources into the ventilation port.

As described above, a camera head which permits efficient external radiation of heat generated by heat sources within the camera head can be realized.

DETAILED DESCRIPTION OF THE INVENTION

Embodiments of the present invention will be described below.

Figure 1:
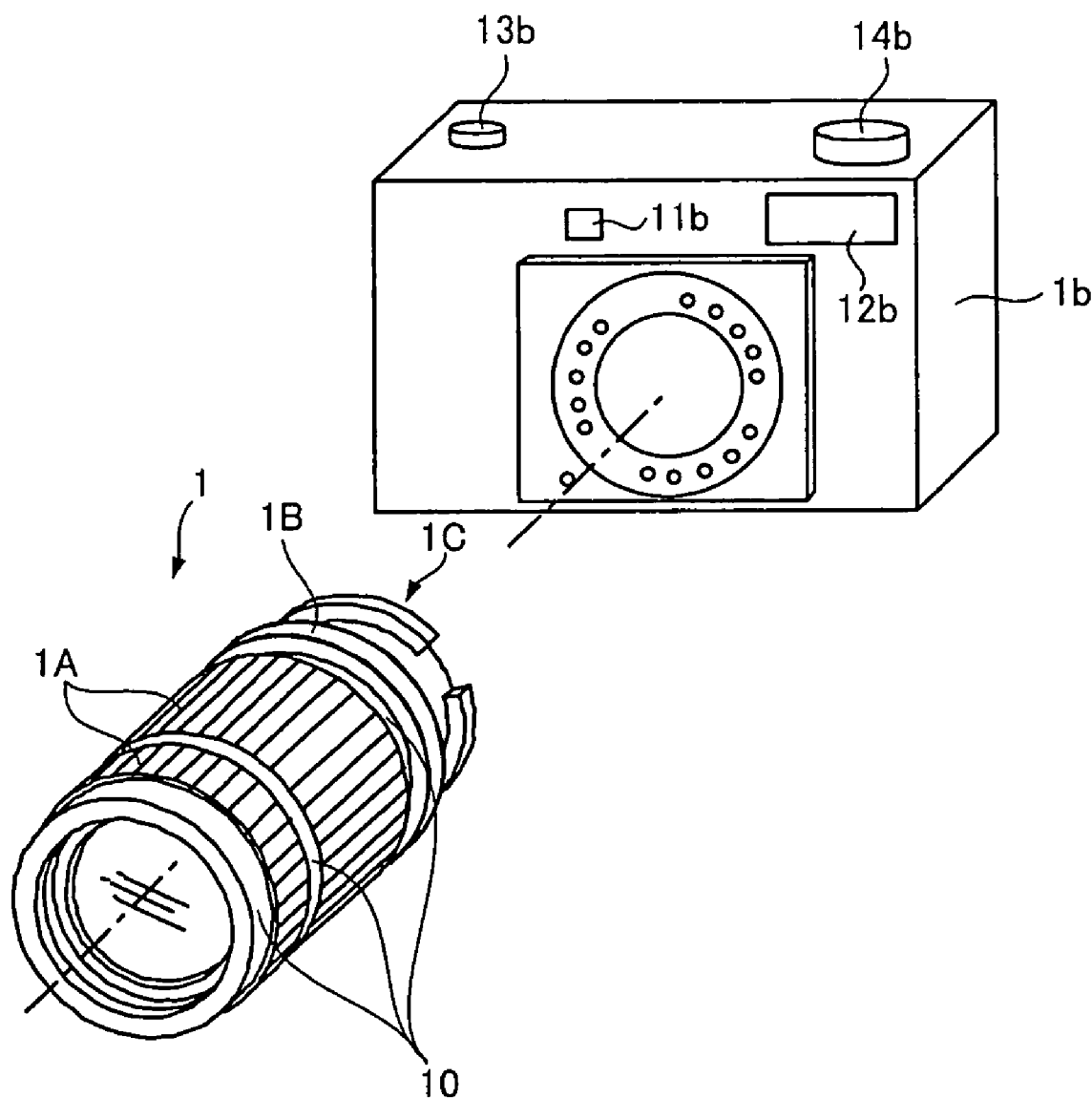
FIG. 1 shows a perspective view of a camera head, which is an embodiment of the present invention, and a camera body on which the camera head is to be mounted, as viewed from obliquely above.
Figure 2:
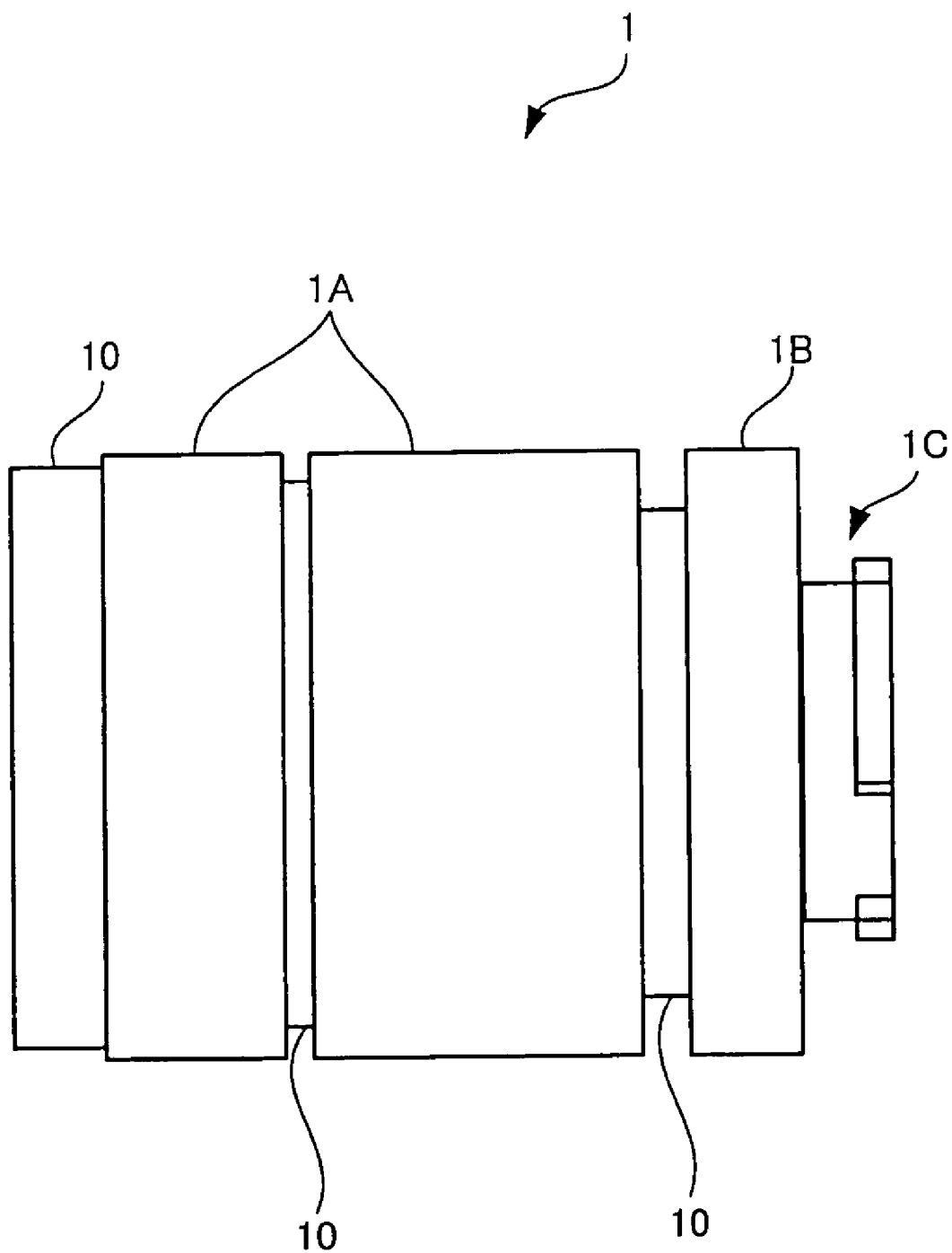
FIG. 2 shows a profile of the camera head embodying the invention, as viewed from a side.

FIG. 1 shows a perspective view of a camera head 1, which is an embodiment of the present invention, and a camera body 1b on which the camera head 1 is to be mounted, as viewed from obliquely above, and FIG. 2 shows a profile of the camera head 1 embodying the invention, as viewed from a side.

The camera head 1 shown in FIG. 1 and FIG. 2 is provided with an image-taking optical system, an imaging element and a CPU, and this camera head 1 is detachably fitted to the camera body 1b shown in FIG. 1 to take images.

As shown in FIG. 1 and FIG. 2, the camera head 1 is provided with turnable control rings 1A on the outer circumference of a lens barrel 10, and a heat radiating member 1B for radiating heat from heat sources within the lens barrel 10 is disposed behind those control ring 1A in the direction of the optical axis. Behind that heat radiating member 1B in the direction of the optical axis, a head mount 1C to be fitted to the mount section of the camera body is disposed.

In the camera head 1 equipped with an image-taking optical system, an imaging element, and a CPU as shown in FIG. 1 and FIG. 2, since it is necessary to cause the image taking lens built into the camera head 1 to form an image of an object on the light receiving face of the imaging element, it is usual for the imaging element to be positioned behind the camera head 1 and the CPU to control that imaging element to be positioned behind that imaging element. Therefore, in the arrangement shown in FIG. 1 and FIG. 2, the heat radiating member 1B whose heat conductivity is higher than that of the lens barrel 10 is disposed behind the lens barrel 10 to have the heat generated by the imaging element and the CPU within the camera head 1 radiated externally by the heat radiating member 1B. Furthermore, as described with reference to the related art, it is also necessary to provided, in addition to such a heat radiating structure, the lens barrel 10 with a dust-proofing and drip-proofing structure to prevent dust and water drips from invading into the lens barrel 10 of the camera head 1 equipped with an imaging element and a CPU.

Hereupon, before describing the internal configuration of the lens barrel 10 provided with this dust-proofing and drip-proofing structure, the internal configuration of the camera headland the camera body 1b will be briefly described.

Figure 3:
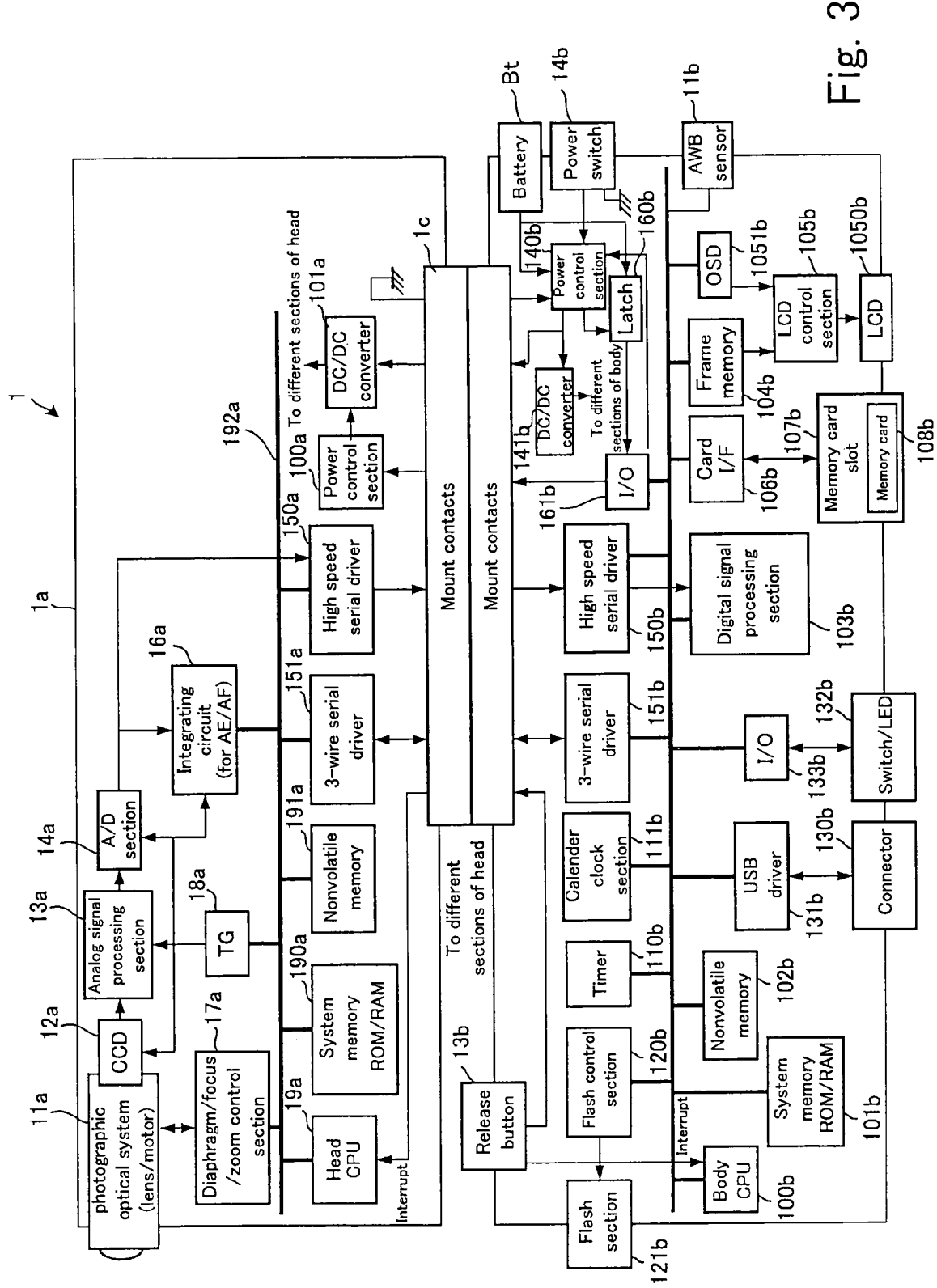
FIG. 3 is a block diagram showing the internal structure of the camera head embodying the invention in a state in which the camera head is fitted to the camera body 1b.

FIG. 3 is a block showing the internal structure of the camera head 1 embodying the invention in a state in which the camera head is fitted to the camera body 1b.

First, the configuration of the camera head 1 will be described.

As shown in FIG. 3, the camera head 1 is provided with an image-taking optical system 11a and an imaging element (hereinafter referred to as CCD because a CCD solid imaging element is used here) 12a. Within that image-taking optical system 11a, the image taking lens and a diaphragm are disposed. An image of an object is formed on the CCD 12a by the image taking lens in that image-taking optical system 11a, and the CCD 12a generates image data. The image data generated by the CCD 12a is supplied to an analog signal processing section 13a and, after the image data have undergone noise reduction and other processing by that analog signal processing section 13a, analog image signals are converted into digital image signals by an A/D section 14a at a later stage to be supplied to a high speed serial driver 150a. The digitized image signals are transmitted to the camera body 1b side by a high speed serial bus driven by this high speed serial driver 150a. A high speed serial driver 150b to drive this high speed serial bus is also disposed on the camera body 1b side, and the high speed serial bus is driven by both drivers. The image signals supplied to the camera body 1b past this high speed serial bus include image signals for through images (hereinafter referred to as through image signals) for displaying on an LCD panel (not shown) the object picked up by the image taking lens in the image-taking optical system when any image taking mode has been selected with a mode dial (which also serves as a power switch) 14b. The image signals also include those for still images obtained by pressing a release button 13b in a state in which a still picture mode has been selected out of the available picture taking modes (hereinafter referred to as still image signals) and those for moving images obtained by pressing the release button 13b in a state in which a moving picture mode has been selected out of the available picture taking modes (hereinafter referred to as moving image signals). Thus there are three types of image signals. Image signals of one or another of these types are transmitted to the camera body side via the high speed serial bus at a request from the camera body 1b side.

On the other hand, the image signals digitized by the A/D section 14a are also supplied to an integrating circuit 16a provided at a stage subsequent to the A/D section 14a. This integrating circuit 16a is intended to perform an automatic focusing function (hereinafter referred to as the AF function) and an automatic exposure control function (hereinafter referred to as the AE function). In this integrating circuit 16a, measuring is performed including the measurement of the luminance of the object to actuate that AE function and the measurement of the distance to the object to actuate the AF function. The distance to and the luminance of the object measured by that integrating circuit 16a are supplied to a diaphragm/focus/zoom control section 17a via a bus 192a, and the diameter of the diaphragm and the position of the focusing lens in the image-taking optical system are controlled by that diaphragm/focus/zoom control section 17a. This arrangement enables, every time the lens in the image-taking optical system provided in this camera head 1a is directed to a different object, the AF function and the AE function are actuated to regulate focusing and the luminance, and image data representing the object in focus are generated and supplied by the CCD 12a.

These CCD 12a, analog signal processing section 13a, A/D section 14a and integrating circuit 16a operate in synchronism with timing signals from a timing generator (hereinafter referred to as TG) 18a, whose operation is controlled by a head CPU 19a. This head CPU 19a controls the TG 18a, the diaphragm/focus/zoom control section 17a and so forth in accordance with programmed procedures stored in a system memory 190a, which stores programs indicating the processing procedures of the AE and the AF and those regarding communication via the serial bus. These programs include a through-the-lens picture processing program and a still picture processing program which are actuated when an image taking mode is selected and further a still picture mode is selected with the mode dial and a moving picture processing program which is actuated when a moving picture taking mode is selected and further a still picture mode. In accordance with processing procedures, the operations of the integrating circuit 16a and the TG 18a, the read/write operations of a nonvolatile memory 191a, and the operations of a three-wire serial driver 151a and the high speed serial driver 150a are all controlled by the head CPU 19a.

Since this camera head 1 is supposed to have no built-in battery in this embodiment of the invention and to operate on power supplied from the camera body 1b side, it is provided with a power control section 100a and a DC/DC converter 101a to be able, when it is supplied with power from the camera body 1b side, to distribute power to different sections within the camera head 1.

The configuration of the camera head has been described so far.

The configuration of the camera body 1b will be described next.

The operations of the camera body 1b are under overall control by a body CPU 100b. This camera body 1b is also provided with a system memory 101b in which programs are stored and a nonvolatile memory 102b into which ID information on each of multiple types of camera head 1b is written for nonvolatile storage. Incidentally, programs indicating the procedure of main processing of this camera system are described in the system memory 101b, and the description covers the procedure of processing through image signals in collaboration with the head CPU 19a on the camera head 1a side, that of processing still image signals and that of processing moving image signals.

In accordance with the programs stored in the system memory 101b, the body CPU 100b controls the exchange of commands over the three-wire serial bus and reception of image signals over the high speed serial bus. That three-wire serial bus is driven by a three-wire serial driver 151b, while the high speed serial bus is driven by a three-wire serial driver 150b, and the operations of these drivers are controlled by the body CPU 100b.

As stated above, the three-wire serial driver 151a on the camera head side and the three-wire serial driver 151b on the camera body side drive the serial bus to enable commands to be exchanged. When a command requesting transmission of a through-the-lens picture is transmitted from the camera body 1b side to the camera head 1a via the three-wire serial bus, the head CPU 19a controls the TG 18a to have through image signals generated by the CCD 12a, and the through image signals are transmitted to the camera body 1b over the high speed serial bus.

These through image signals transmitted to the camera body 1b over the high speed serial bus are supplied to a digital signal processing section 103b via the high speed serial driver 150b and, after undergoing prescribed processing by this digital signal processing section 103b, are stored into a frame memory 104b. YC signals stored in this frame memory 104b are supplied to an LCD control section 105b, which displays a through-the-lens picture on the panel of an LCD 1050b.

When a camera user presses the release button 13b while looking at this through-the-lens picture, an interrupt signal is supplied to both the body CPU 100b and the head CPU 19a, the processing of that through-the-lens picture is suspended, and the interrupt from outside actuates still picture processing programs described in both system memories 190a and 101b. As shown in FIG. 2, since a release signal is directly entered into the external interrupt input pins of both the body CPU 100b and the head CPU 19a when the release button 13b is pressed, the head CPU 19a on the camera head 1a side causes the TG 18a to supply an exposure start signal to the CCD 12a at the interrupt timing when the release button 13b is pressed and thereby causes the CCD 12a to start exposure.

After that, the TG 18a is caused to supply an exposure end signal to the CCD 12a to have the CCD 12a supply still image signals made up of all-pixel data to the analog signal processing section 13a. Those still image signals supplied to the analog signal processing section 13a are supplied from the analog signal processing section to the digital signal processing section 103b by way of the A/D section 14a and the high speed serial bus driven by the high speed serial driver 150a, and a JPEG file having undergone JPEG compression by that signal processing section 103b is stored via a card I/F 106b into a memory card 108b loaded into a memory card slot 107b. When the mode dial 14b is set to the moving picture mode, pressing of the release button 13b causes an interrupt to arise and thereby actuates the moving picture processing program. Then, moving image signals are supplied to the digital signal processing section 103b at prescribed points of time over the high speed serial bus, and a motion JPEG or MPEG compression takes place to be recorded in the memory card 108b.

Though not directly related to the present invention, the camera is also equipped with a timer 110b for use in timer processing and a calendar clock section 111b. For instance, when calendar data is supplied to the LCD control section 105b from the calendar clock section 111b, a clock and/or a calendar are displayed, together with the object, on the panel of the LCD 1050b. Further, the camera body 1b has a connector 130b conforming to the USB standards, and when a personal computer or the like is connected via that connector 130b, image signals in the memory card are transferred to the personal computer by way of a USB driver 131b and the connector 130b. The configuration further includes a flash lighting device having a flash section 121b, which emits a flash light through a flash lighting window 12b shown in FIG. 1, and a flash control section 120b and a switch/LED 132b positioned on the back of the camera body, and these flash lighting device and switch are connected to the body CPU 100b via an I/O 133b to operate under the control of the body CPU 100b.

The camera head 1 is fitted to the camera body 1b having such an internal configuration to be used in photography.

Hereupon, it will be described how the heat generated by the head CPU 19a and the CCD 12a, which are provided in the camera head 1 and emit relatively high calorific power, is guided from inside to outside the lens barrel 10 of the camera head 1 having a dust-proofing and drip-proofing structure and is radiated.

Figure 4:
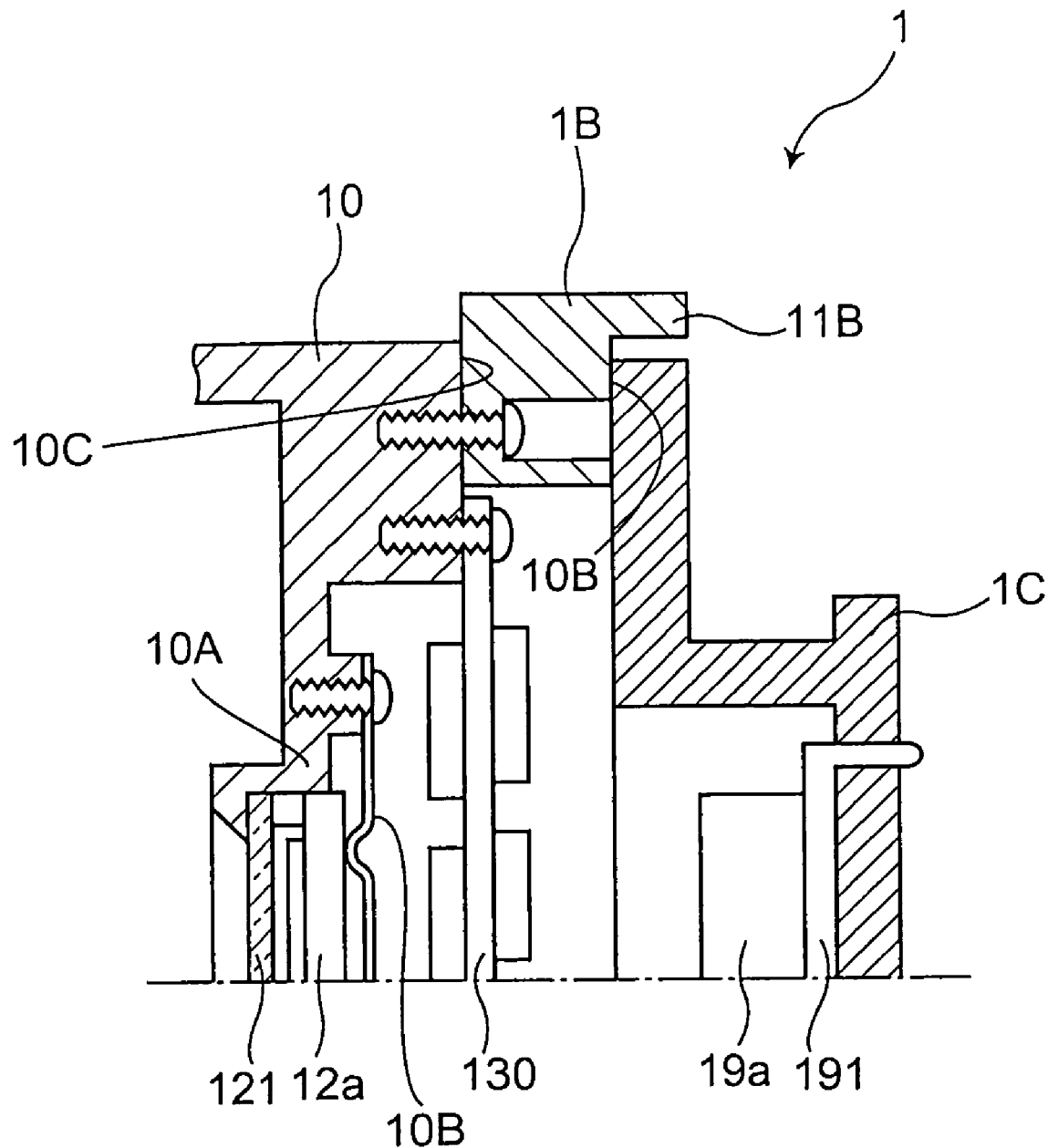
FIG. 4 shows the internal structure of the rear part, in the direction of the optical axis, of the lens barrel of the camera head.

FIG. 4 shows the internal structure of the rear part, in the direction of the optical axis, of the lens barrel 10 of the camera head 1.

Though not shown, the image taking lens is positioned toward the left hand side of FIG. 4, and the CCD 12a is so arranged as to be aligned with the optical axis of that image taking lens. In other words, the left side of FIG. 4 is forward in the direction of the optical axis. An LPF 121 is arranged ahead of the light receiving face of that CCD 12a with some spacing, and those LPF 121 and CCD 12a are fixed, squeezed between a CCD fitting section 10A, extending from the lens barrel 10 toward inside the lens barrel 10, and a CCD holder 10B. That CCD holder 10B is shaped as a leaf spring, of which one end is fixed to the lens barrel 10 with a screw. As a result, the LPF 121 and the CCD 12a are urged by the springy force of the CCD holder 10B to be firmly fixed. Behind that CCD holder 10B, a board 130 on which the TG to drive the CCD 12a is mounted is arranged, and an end of the board 130 is fixed to the lens barrel 10 with a screw. Further, the heat radiating member 1B is so connected as to keep one face of the heat radiating member 1B in contact with the rear end face 10C of that lens barrel 10 and to keep one face of the mount section 1C in contact with the backward end face 10B of the heat radiating member 1B. A board 191 on which the CPU 19a is mounted is directly fixed to that mount section 1c.

The connection of the lens barrel 10 and the mount section 1C in this way to the heat radiating member 1B which has faces of some contact with the external atmosphere enables the heat generated by the CCD 12a fitted to the CCD fitting section 10A extending from the lens barrel 10 and that generated by the CPU 19a on the board 191 fixed to the mount section 1C can be efficiently transferred to the heat radiating member 1B and radiated outward.

First, it will be described by what route the heat generated by the CCD 12a is transferred to the heat radiating member 1B.

The heat generated by the CCD 12a shown in FIG. 4 is transferred to the vicinity of the heat radiating member 1B via the CCD fitting section 10A on the lens barrel 10 side. As the rear end face 10C of that lens barrel 10 is connected to one face of the heat radiating member in a relatively large area of contact, the heat generated by the CCD 12a is transferred to the heat radiating member 1B and efficiently radiated. The heat generated by the CPU 19a is efficiently transferred via the mount section 1C to the heat radiating member 1B whose face 10B is contact with the mount section, and radiated out of the heat radiating member 1B. Since the heat radiating member 1B is a member higher in heat conductivity than the lens barrel 10 as stated above, the heat transferred from both the lens barrel 10 and the mount section 1C is efficiently transferred to the heat radiating member 1B, which is kept at low temperature by its constant contact with the external atmosphere, and radiated into the outer space. Further in this case, fins 11B are provided on the outer circumference of the heat radiating member 1B to enlarge the area of contact with the outer atmosphere and thereby to enhance the efficiency of heat radiation.

Hereupon, it will be described with reference to FIGS. 5(a) to 5(d) what shape would enable the fins 11B to help efficiently radiate outward the heat generated within the lens barrel.

FIGS. 5(a) to 5(d) show the shapes of the fins.

FIG. 5(a) shows fins made up of multiple protruded stripes and grooves alternately arranged in the direction of the optical axis and surrounding the outer circumference of the rear end of the heat radiating member 1B around the optical axis. FIG. 5(b) shows fins 11B made up of multiple protruded stripes and grooves extending in the direction of the optical axis and alternately surrounding the outer circumference of the rear end of the heat radiating member 1B. FIG. 5(c) shows fins 11B made up of multiple protruded stripes and grooves extending spirally around the optical axis and alternately surrounding the outer circumference of the rear end of the heat radiating member 1B. Further, FIG. 5(d) shows fins resulting from the modification of the shapes of the protruded stripes and grooves of the fins shown in FIG. 5(b) preventing the edges of the protruded stripes from hurting the user's fingers by arranging in a corrugate shape around the optical axis protruded stripes and grooves extending in the optical axis.

In providing any set of the fins shown in FIG. 5(a) through FIG. 5(d), they are enabled to radiate heat efficiently by so setting dimensions B and L that the condition of the following equation be satisfied:

$$B = (L/\Delta T)^{0.25}$$

where ΔT is the permissible limit of temperature rise, B (mm), the width of each groove between protruded stripes in FIG. 5(a) through FIG. 5(d) and H, the height from the groove surface to the peak of the protruded stripe.

Now, the fins of the shape shown in FIG. 5(a) can be expected to give a satisfactory heat radiating effect when the camera head 1 is positioned horizontally, while fins of the shape shown in FIG. 5(b) can be expected to give a satisfactory heat radiating effect when the camera head 1 is directed upward or downward. Further, the fins of the shape shown in FIG. 5(c) can be expected to give an aesthetic appeal to the user in addition to the heat radiating effect, while the fins of the shape shown in FIG. 5(d) can be expected to eliminate the hazardous factor of injuring the user's fingers or palm with the edges of the protruded stripes in addition to the aesthetic appeal to the user, thereby to ensure safety for the user when he or she is to use the camera head 1a shown in FIG. 1.

Since the heat radiating member can be equipped with fins of various shapes as hitherto described, a satisfactory heat radiating effect can be achieved by providing the camera head with fins of the shape suitable for the camera head direction which is most likely to be selected by the camera user. Moreover, some shapes of fins can provide a visual aesthetic appeal or even a safety effect in addition to the intrinsic heat radiating effect of the fins.

Although the heat radiating structure described above can by itself provide a sufficient heat radiating effect, an additional heat radiating effect can be achieved by further providing a heat radiating member 100B with a heat receiving section 101B extending to the vicinity of a heat source (the CPU 19a is deemed to be the greatest heat source here).

Figure 6:
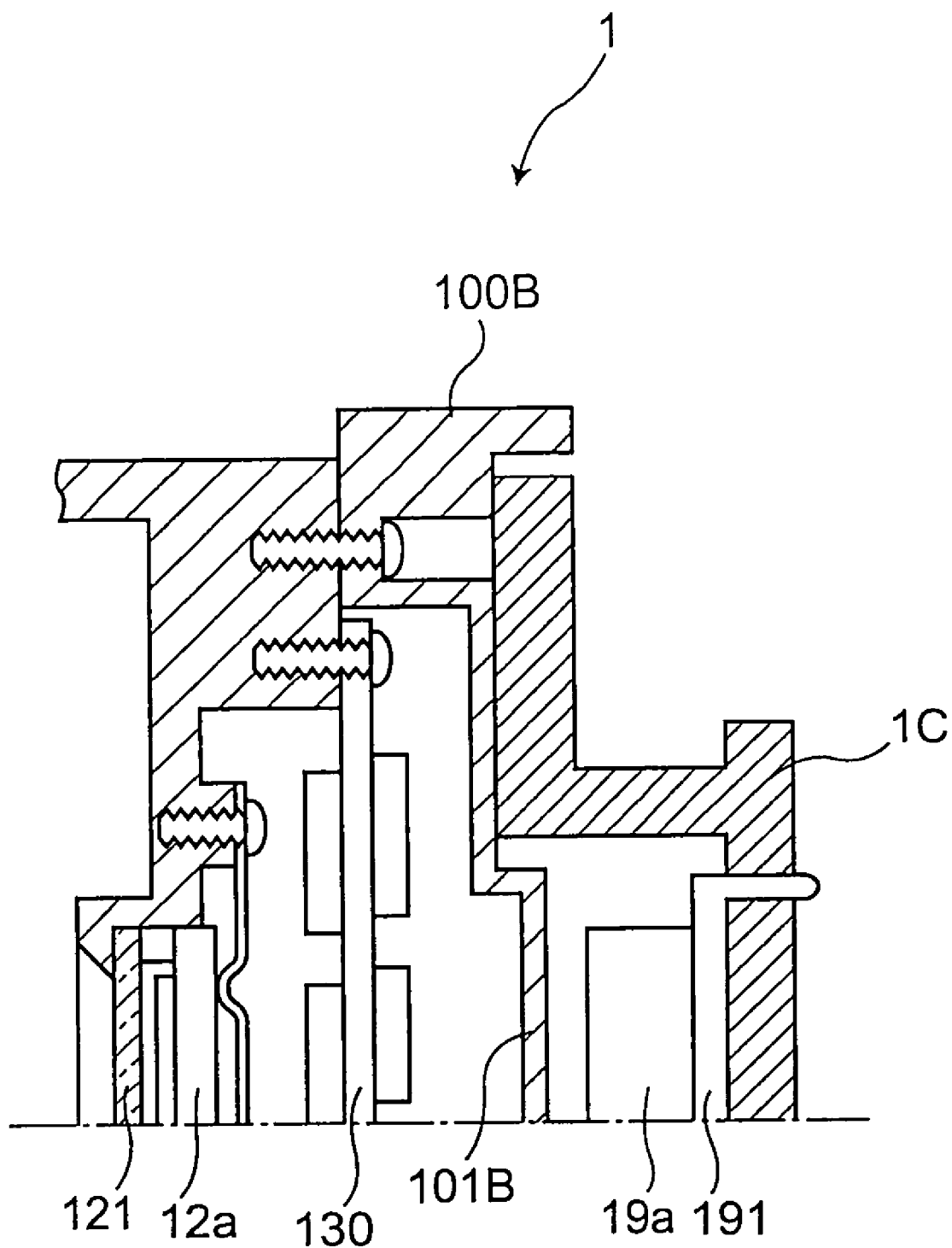
FIG. 6 shows a configuration wherein a heat radiating member having a heat receiving section which extends to the vicinity of a CPU, which is a heat source, is arranged within the camera head.

FIG. 6 shows a configuration wherein the heat radiating member 100B having the heat receiving section 101B which extends to the vicinity of the CPU 19a, which is a heat source, is arranged within the camera head.

Figure 5:
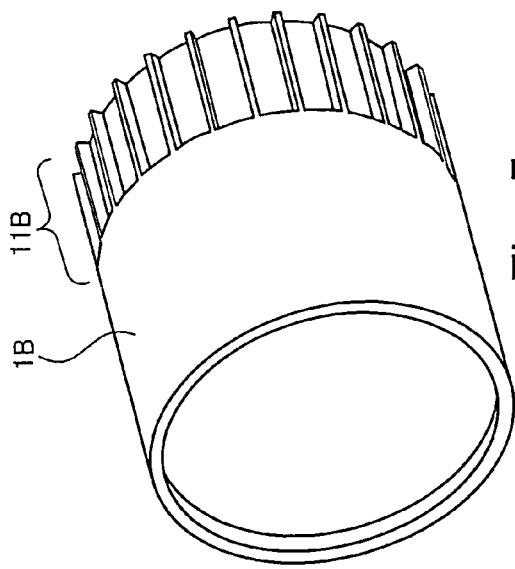
FIGS. 5A-5D show the shapes of fins.
Figure 5:
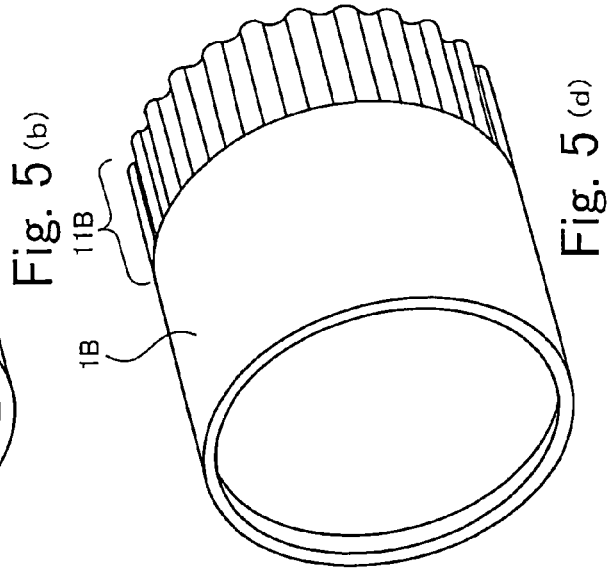
Figure 5:
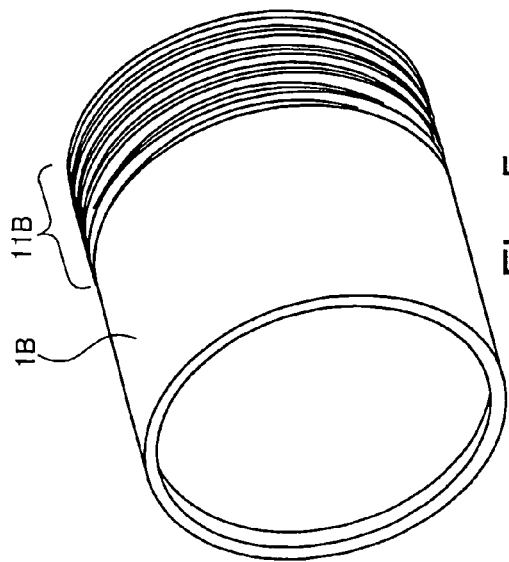
Figure 5:
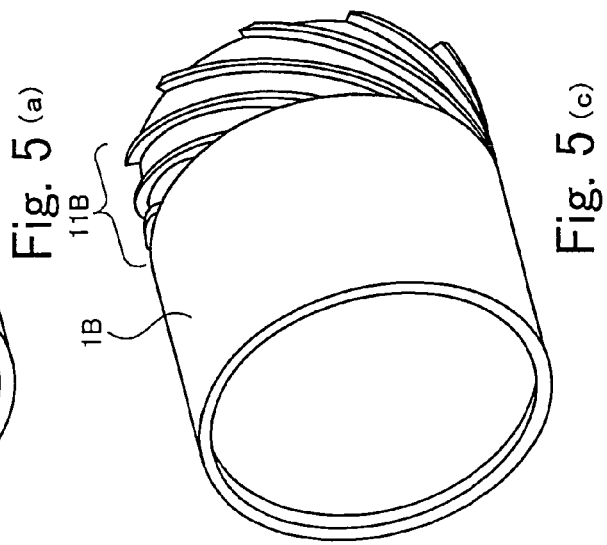

As shown in FIG. 5, there is provided the heat receiving section 101B which extends to the vicinity of the CPU 19a. In this way, in addition to the transfer of the heat generated by the CPU 19a to the heat radiating member 100B via the mount section 1C, the heat is also transferred to the heat receiving section 101B of the heat radiating member 100B, resulting in an increase in the quantity of transported heat and accordingly even more efficient head radiation than by the configuration shown in FIG. 4.

Figure 7:
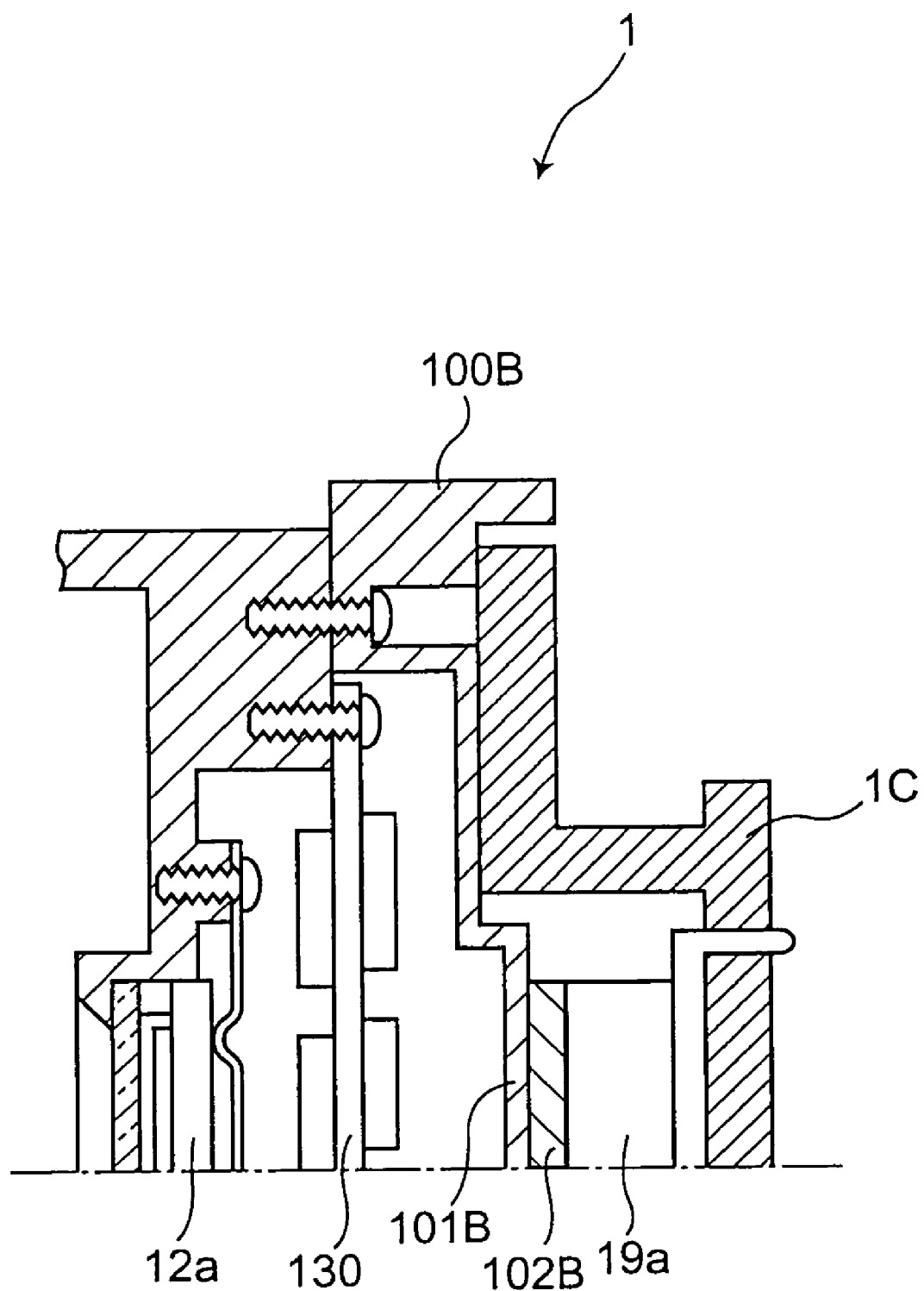
FIG. 7 shows a case in which a heat transfer member for establishing communication between the heat receiving section and a heat source, which is the CPU here, is additionally provided.

FIG. 7 shows a case in which a heat transfer member 102B for establishing communication between the heat receiving section 101B and a heat source, which is the CPU 19a here, is additionally provided.

Use of a heat transfer member excellent in heat transfer performance, such as amber, in the hatched portion 102B in FIG. 7 would further increase the quantity of heat transported to the heat radiating member. The hatched portion 102B may as well be filled with one of the heat transfer gels which are now commercially available.

Figure 8:
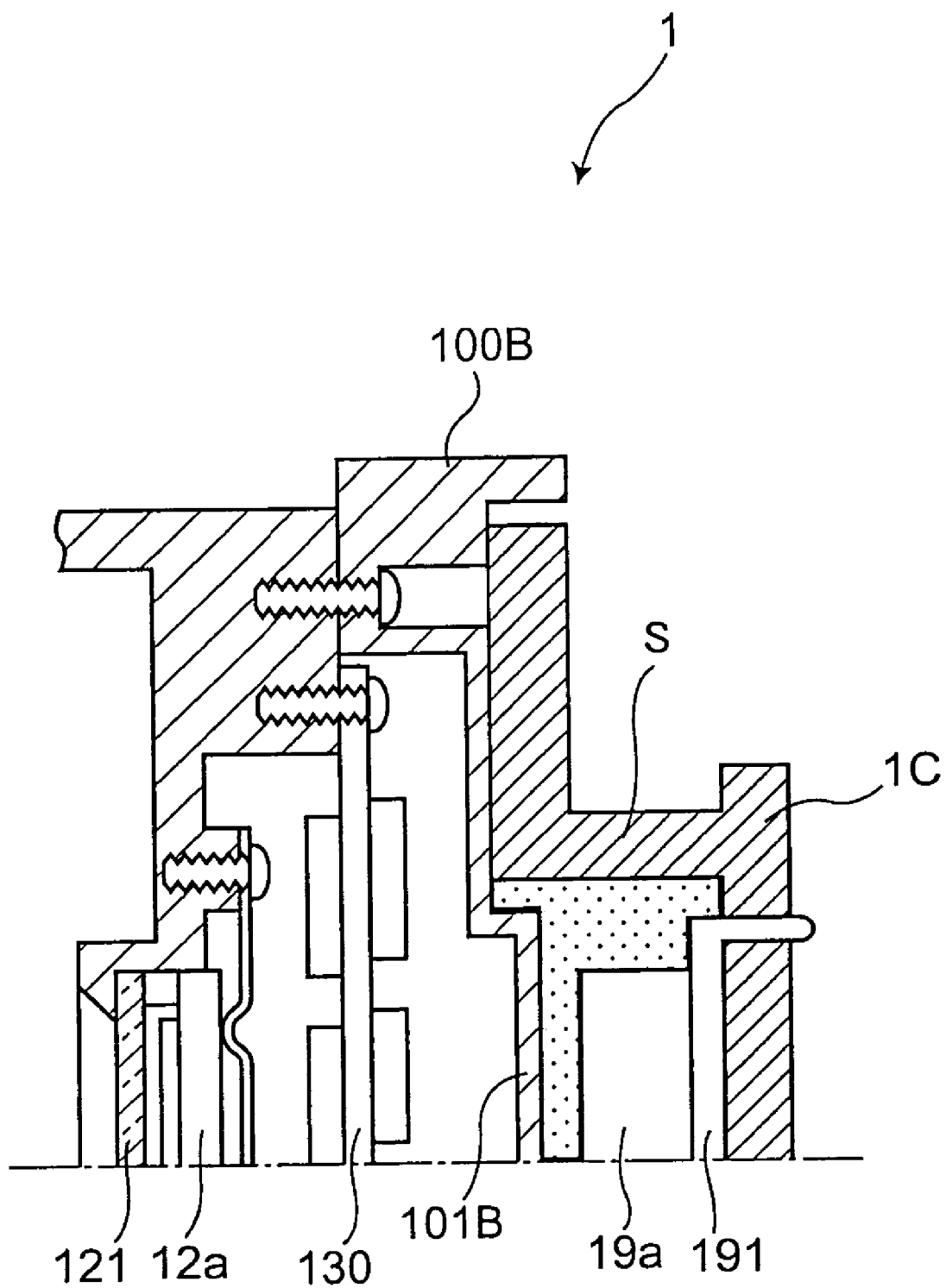
FIG. 8 shows a case in which an airtight structure is provided in which the flow of any gaseous matter between a region including the space between the heat receiving section and a heat source, which is the CPU, and the outside is prevented, and the region is filled with a heat transfer gas.

FIG. 8 shows a case in which an airtight structure is provided in which the flow of any gaseous matter between a region including the space between the heat receiving section 101B and a heat source, which is the CPU 19a here, and the outside is prevented, and the region is filled with a heat transfer gas.

Since the lens barrel 10 of this camera head 1 has a dust-proofing and drip-proofing structure as stated above, it is also conceivable to increase the dust-proofing and drip-proofing performance by isolating the surroundings of the CPU 19a and forming the surroundings of the CPU 19a as an airtight structure with the mount section 1C and the heat receiving section 101B of the heat radiating member. In this way, the surroundings of the CPU 19a constituting the airtight structure (the dotted area S in FIG. 8) can be filled with a gas, which may be helium for instance. Then, the helium would facilitate heat transfer from the CPU 19a to the heat radiating member 100B without having to connecting the CPU 19a and the heat receiving section 101B by a heat transfer member.

As described above, the camera head 1, even if it is provided with a dust-proofing and drip-proofing structure, can efficiently radiate the heat generated by heat sources within it.

Furthermore, where the heat radiating member 1B (or 100B) is provided as shown in FIG. 4 through FIG. 8, the camera user may inadvertently let his or her fingers touch the heat radiating member 1B when trying to take an image by using this camera head.

Figure 9:
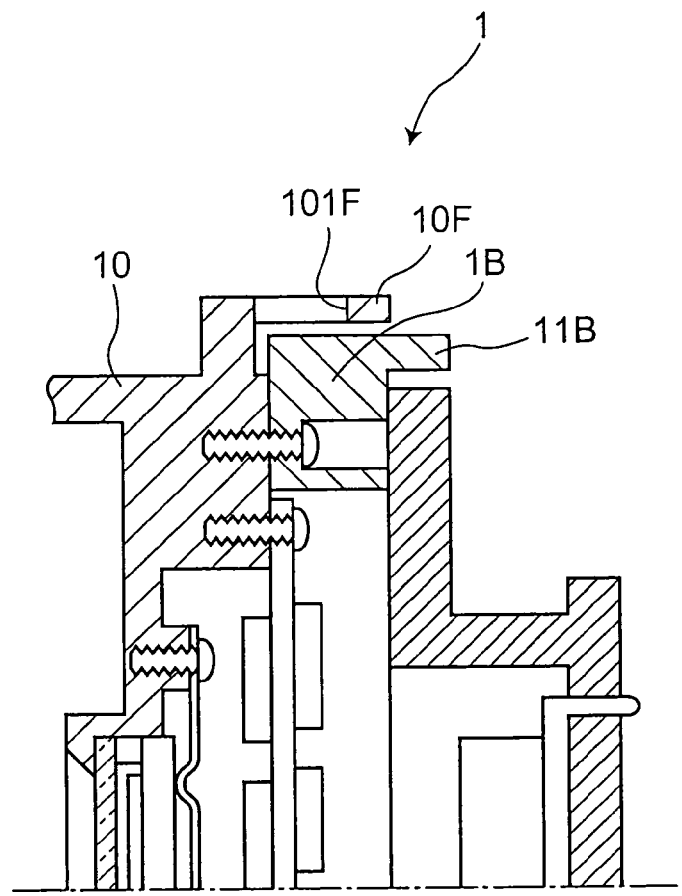
FIG. 9 shows a configuration wherein an eave section which protrudes over the outer circumference of a heat radiating member is provided to prevent user's fingers from coming into contact with the heat radiating member.

FIG. 9 shows a configuration wherein an eave section 10F which protrudes over the outer circumference of a heat radiating member is provided to prevent the user's fingers from coming into contact with the heat radiating member 1B.

The arrangement shown in FIG. 9 eliminates the risk of the camera user's fingers touching the heat radiating member 1B and, when he or she tries to take an image with this camera head 1 fitted to the camera body 1d, his or her fingers will be prevented from accidentally touching the heat radiating member 1B.

Further, if the presence of the eave section 10F results in shrinking the area of contact of the heat radiating member 1B with the external atmosphere, the heat radiating effect will be reduced. In view of this fear, a ventilation port 101F is disposed in the eave section 10F in this example to maximize the area of contact with the external atmosphere and accordingly increasing the heat radiating effect.

Finally, a case in which a vertically penetrating ventilation port 2B is disposed, instead of disposing the heat radiating member 1B, in another camera head 2 will be described below.

Figure 10:
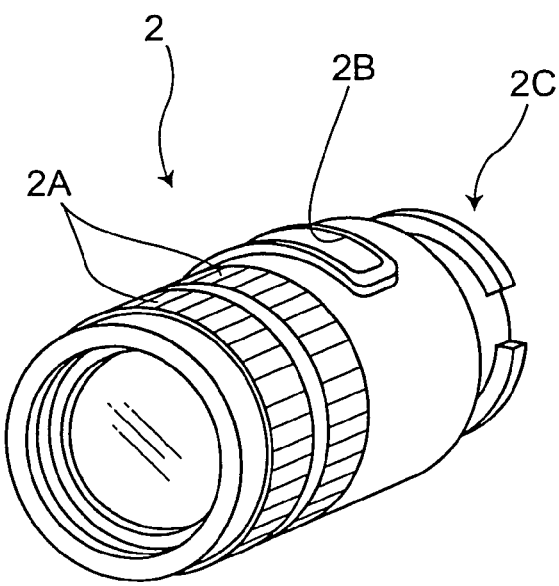
FIG. 10 shows a camera head as viewed from the front side obliquely above.
Figure 11:
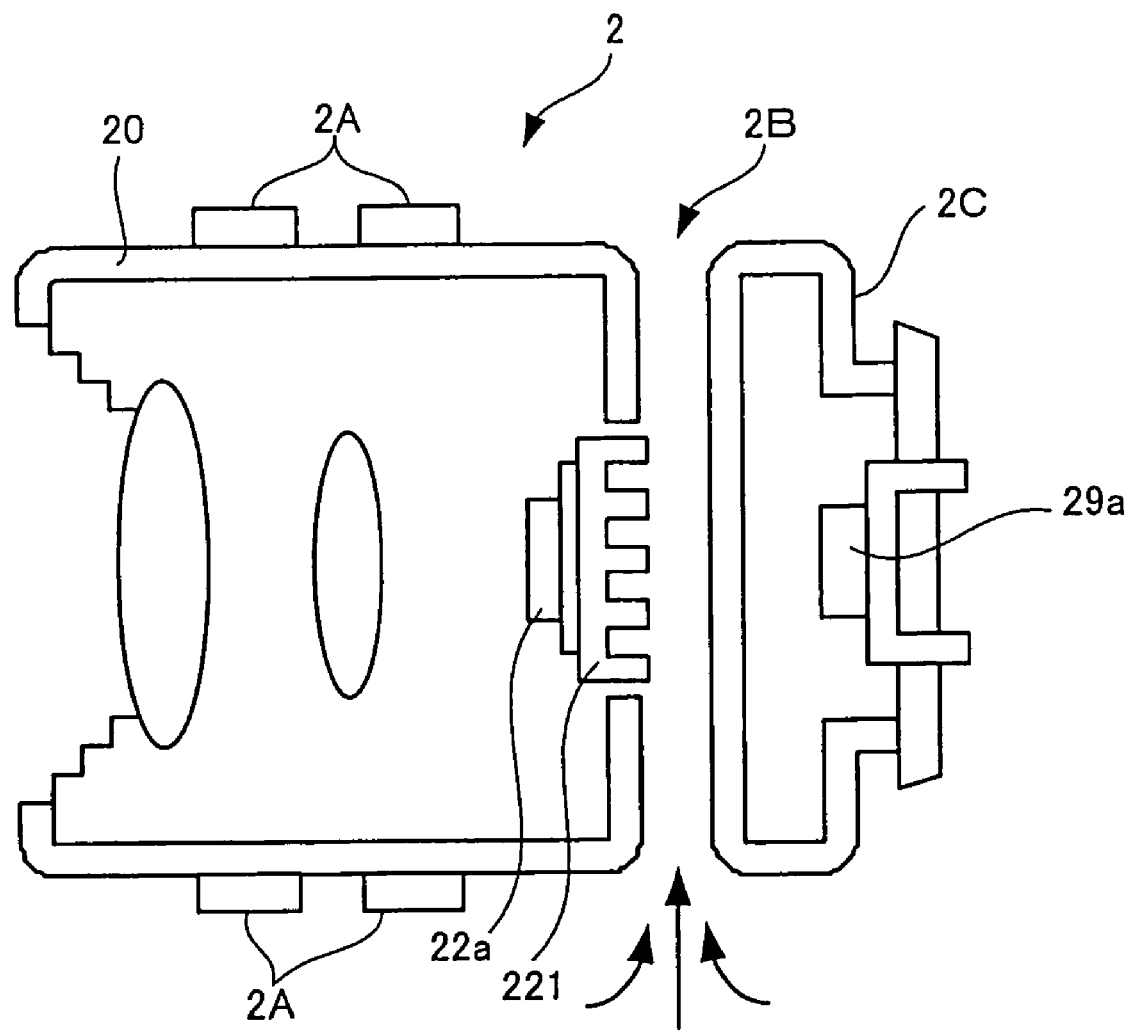
FIG. 11 shows a profile of a section of the camera head of FIG. 10 cut along the optical axis.

FIG. 10 shows a camera head 2 as viewed from the front side obliquely above and FIG. 11, a profile of a section of the camera head 2 of FIG. 10 cut along the optical axis.

As shown FIG. 10 and FIG. 11, the vertically penetrating ventilation port 2B is disposed farther backward in the direction of the optical axis than the control ring 2A. This arrangement dispenses with the heat radiating member 1B or 100B shown in FIG. 4 through FIG. 9, and the heat generated in a CPU 29a and that generated in a CCD 22a are radiated into that ventilation port 2B and through the ventilation port 2B to the outside. In this example, the CCD 22a is provided with a heat sink 221 for further improvement in heat radiating efficiency. This arrangement would enable the external atmosphere circulating in the ventilation port 2B part to contribute to even more efficient heat radiation.

What is claimed is:

1. A camera head which is provided with an image-taking optical system and an imaging element, is detachably fitted to and transmits image signals to a camera body which receives and processes the image signals, the camera head comprising:

a lens barrel which holds inside both the image-taking optical system and the imaging element and is provided with a rotatable control ring on the outer circumference thereof, and the lens barrel is provided with a heat radiating member, which has a higher heat conductivity than the heat conductivity of the lens barrel and radiates heat from heat sources within the lens barrel, in a position farther backward in the direction of the optical axis than the control ring.

2. The camera head according to claim 1, wherein at least one of the outer circumference and the inner circumference of the heat radiating member has fins.

3. The camera head according to claim 2, wherein the fins have a shape in which a plurality of protruded stripes and grooves surrounding the outer circumference are alternately arranged around the optical axis.

4. The camera head according to claim 2, wherein the fins have a shape in which a plurality of protruded stripes and grooves extending on the outer circumference in the direction of the optical axis are alternately arranged around the optical axis.

5. The camera head according to claim 4, wherein the fins are arranged in a corrugate shape around the optical axis.

6. The camera head according to claim 2, wherein the fins have a shape in which a plurality of protruded stripes and grooves spirally extending on the outer circumference are alternately arranged around the optical axis.

7. The camera head according to claim 1, wherein an eave section which protrudes over the outer circumference of the heat radiating member is provided to prevent user's fingers from coming into contact with the heat radiating member.

8. The camera head according to claim 7, wherein the eave section has a ventilation port.

9. The camera head according to claim 1, wherein the heat radiating member has a heat receiving section which extends to the vicinity of the heat sources.

10. The camera head according to claim 9, further having a heat transfer member which establishes communication between the heat receiving section and the heat sources.

11. The camera head according to claim 9, comprising an airtight structure in which the flow of any gaseous matter between a region including the space between the heat receiving section and the heat sources and the outside is prevented, and the region is filled with a heat transfer gas.

12. The camera head according to claim 1, wherein the lens barrel has a vertically penetrating ventilation port farther backward in the direction of the optical axis than the control ring, and the heat radiating member radiates the heat from the heat sources into the ventilation port.

\* \* \* \* \*